Patented Nov. 13, 1928.

1,691,426

UNITED STATES PATENT OFFICE.

EUGENE E. AYRES, JR., OF SWARTHMORE, AND ERLING H. HAABESTAD, OF PHILADELPHIA, PENNSYLVANIA, ASSIGNORS TO B. A. S. COMPANY, OF PHILADELPHIA, PENNSYLVANIA, A CORPORATION OF DELAWARE.

HYDROLYSIS OF ESTER-FORMING COMPOUNDS.

No Drawing. Application filed October 21, 1924. Serial No. 745,008.

Our invention relates to processes for the hydrolysis of liquid esters of inorganic acids.

It is an object of our invention to provide a process whereby hydroxyl groups may be substituted readily and without formation of undesirable compounds or by-products, for acid radicals of liquid esters of inorganic acids, examples of such compounds being halogen derivatives of hydrocarbons, mercaptans of the general formula RSH where R refers to any organic radical, sulphides of the general formula RSR where R refers to any organic radical, etc. In general our process consists in heating suitably proportioned amounts of the organic substance to be treated and an aqueous solution of an alkali together with a suitable catalyst until the conversion is substantially complete. The products produced by hydrolysis in accordance with our invention are generally stable compounds but when such products contain more than one hydroxyl group they may be unstable and may lose water.

In our process the hydrolysis is effected without such stirring or agitation during the reaction period as has previously been necessary to effect such a reaction. Such agitation or stirring has heretofore been very troublesome because the reacting substances frequently must be at high temperature under high pressure but it has been necessary because the rate of reaction between the immiscible liquids employed is dependent upon the amount of contact surface which in turn, in previous processes, has been dependent upon the degree of agitation. Furthermore, in our process we secure a relatively high rate of reaction and we are therefore able to use temperatures considerably lower than temperatures employed in other processes. And in our process the formation of olefins is eliminated to such an extent that the use of high pressures is not necessary.

While it has been suggested to treat halides of hydrocarbons with alkalies such as sodium hydroxide to produce alcohols by substituting the hydroxyl group for the halide, such difficulties have been experienced as to frequently prevent commercial application of such a process. Dry sodium hydroxide will yield principally products other than alcohols. Aqueous solutions of caustic soda being immiscible with the organic halide, a reasonable velocity of reaction requires not only a high temperature under great pressure but also mechanical agitation for maintaining such emulsion of the mixture as will insure adequate contact surface between the reacting substances. In carrying out a reaction with aqueous caustic soda a substantial proportion of olefins will be produced unless very high pressures are employed. An example of a reaction wherein olefins are produced is:

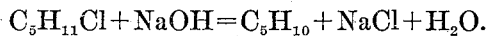
$$C_5H_{11}Cl + NaOH = C_5H_{10} + NaCl + H_2O.$$

In substituting hydroxyl groups in accordance with our invention the avoidance of these difficulties is so nearly complete that a substantially quantitative yield of the hydrolyzed compound may be obtained through inexpensive and practical means. In our process a high rate of reaction is secured at relatively moderate temperatures and pressures by maintaining an extensive contact surface without agitation and with the consequent substantial avoidance of the formation of olefins. To secure extensive surface contact between the substance to be treated and the aqueous alkaline reagent, the substance and reagent are brought together in the presence of an organic ester that is capable of being spontaneously regenerated in the presence of the substance and the reagent; and in the formation and regeneration of the organic ester the salt from which the organic ester is produced, e. g. soap, is maintained in colloidal contact with the liquid ester of an inorganic acid, e. g. amyl chloride, the presence of water, and the presence of alcohol after hydroylsis begins, acting to maintain such contact. Thus in accordance with our process the organic ester is employed in effect as a catalyst and the process is carried on continuously, or intermittently with periodic removals of the hydrolyzed compound and salt water.

Our process is particularly applicable to the production of alcohols and to the hydrolysis of liquid organic halides. For the purpose of assisting in the understanding of our invention and for the purpose of illustrating both of the above modes of operation in the same process, the production of amyl alcohol in accordance therewith will be described but it is not intended that our invention shall be limited to the production of such substance.

In the employment of our invention for the production of amyl alcohol the only materials in addition to the raw product pentane and a fixed quantity of a suitable organic ester, are chlorine, caustic soda and water, and if electrolytic equipment is available the additional materials are reduced to common salt and water, all of the salt being recoverable and in operations on a large scale at least a half of it being re-used.

In producing amyl alcohol in accordance with our invention, pentane or that part of gasoline boiling between 20° C. and 40° C. will be chlorinated by any method that will produce a large proportion of the primary mono-chlorides. An organic ester suitable for use as the catalyst in the practice of our invention may be purchased in the open market, e. g., amyl- or ethyl-oleate, or such an ester may be produced by the well known method of alcoholysis of olein or by heating a liquid ester of an inorganic acid, e. g., amyl chloride, with a salt of a substantially water-insoluble fatty acid in the presence of water, and eliminating the resulting brine. Aqueous alkalies or alkaline salts, e. g. caustic alkali, and organic chlorides, for example the amyl chloride that is referred to in the illustration of our process herein described, in approximately molecular proportions are added to the ester catalyst and the mass is heated until the reaction is complete, and salt water is removed, it being sometimes convenient in practice, however, to have an excess of the aqueous alkali present.

While it appears that the alkali causes saponification of the organic esters with the formation of alcohols and soaps and that the soaps react with the organic halides to reform the esters and to form salt we suggest this cycle of reactions as a possible explanation but do not intend to be bound thereby.

Such a cycle may be illustrated with amyl chloride, caustic soda and amyl oleate. The amyl oleate is the ester which, although definitely entering the alcohol reaction, may, nevertheless, be considered a catalyst in that it is formed to the same extent that it is decomposed.

The alcohol reactions may be written:

(1) $\underset{\text{Amyl oleate}}{C_{17}H_{33}.COOC_5H_{11}} + \underset{\text{Caustic soda}}{NaOH} = \underset{\text{Soap}}{C_{17}H_{33}.COONa} + \underset{\text{Amyl alcohol}}{C_5H_{11}OH}$ (2) $C_{17}H_{33}.COONa + C_5H_{11}Cl = C_{17}H_{33}.COOC_5H_{11} + NaCl$ Equation (1) represents the decomposition of the catalyst while equation (2) represents its reformation. The two reactions take place simultaneously, although (1) appears to have a higher initial velocity than (2). This is of advantage for the reason that colloidal contact is insured throughout the reaction (2), and there is little likelihood of prolonged contact between amyl chloride and caustic soda.

A numerical example follows:

350 grams of oleic acid are put in an iron autoclave. 120 grams of amyl chloride and 200 grams of a 20% caustic soda solution are stirred in. The mass is heated for several hours at 150° C. The cataylst is now ready for alcohol formation.

100 grams of amyl chloride and 200 grams of a 20% solution of caustic soda are stirred in, making a gelatinous mass because of partial immediate saponification.

The gel is heated to a temperature that will produce a suitable reaction velocity, e. g., 150° C. for three hours.

The resulting material is now in two layers. The upper layer is a mixture of amyl oleate with amyl alcohol. The lower layer is an aqueous solution of salt water. The salt water is run off.

The amyl alcohol may be removed from the amyl oleate at this stage and the next charge of amyl chloride and caustic soda may be introduced and the cycle may be repeated.

While the amyl alcohol so formed may be driven out by steam distillation or vacuum distillation, a very practical method of removing it consists in distillation under pressure. In such an operation the salt water formed from the reaction is drawn from the bottom of the autoclave before the pressure is released and the vapors in the autoclave are released through a condenser to a receiver. As the vapors pass out of the autoclave the temperature is kept practically constant and the pressure is gradually reduced to atmospheric pressure. In this way alcohols and residual amyl chlorides are very effectively removed from the mixture.

In addition to the fact that our process may be employed to produce alcohol from hydrocarbons with only salt and water and a fixed quantity of catalyst as the necessary materials, an important advantage is that in producing amyl alcohol only one by-product, namely, di-hydroxy pentane is produced and that material has a value comparable to that of amyl alcohol. Substantially no unsaturated hydrocarbons are formed and there are no accumulations of intermediate products. But in former processes higher chlorides of pentane and a variety of unsaturated hydrocarbons are produced.

In our process the maximum pressure for the hydrolysis of amyl chloride is only what is necessary to maintain the mass at a temperature that will cause a suitable reaction velocity.

In our application Ser. No. 745,006, filed

October 21st, 1924, we claim the process of producing a gel by heating a water-soluble salt of a water-insoluble fatty acid with a liquid ester of an inorganic acid, and also the product thereby produced. In our application Ser. No. 745,007, filed October 21st, 1924, and renewed April 20th, 1927, we claim the production of esters by reacting a liquid ester of an inorganic acid with a salt of a substantially water-insoluble fatty acid in the presence of water.

Our process may be employed in the hydrolysis of liquid esters of inorganic acids generally of which examples are the chlorides, mercaptans, and nitrates of hydrocarbons, liquid esters of inorganic acids that do not contain oxygen being preferred. Within the spirit of our invention a liquid ester of an inorganic acid is to be considered as any such an ester that is liquid at the temperature at which the reaction occurs either by reason of its boiling point being above the temperature of the reaction or by reason of the pressure under which the reaction occurs.

Liquid esters of inorganic acid that may be utilized in the practice of this invention contain an organic radical and a radical or one or more atoms capable of being replaced by another organic radical and capable of combining with a metal to form a stable inorganic salt. Amyl chloride is an example of such a liquid ester of an inorganic acid that may be used in the practice of this invention because its chlorine is replaceable by, for example, the acid radical of oleic acid and chlorine is capable of combining with, for example, sodium to form a stable salt, both of these results being obtainable by reacting amyl chloride with sodium oleate, the resulting ester being amyl oleate and the resulting salt being sodium chloride. Another example, is ethyl nitrate in which the nitrate radical is replaceable by, for example, the acid radical of abietic acid and is also capable of combining with, for example, magnesium to form a stable salt, the treatment of ethyl nitrate with magnesium abietate producing ethyl abietate and magnesium nitrate. In the light of the general principles and specific examples herein set forth, the use of this invention in connection with numerous specific substances will be apparent, and as another example magnesium benzene sulphonate reacted with ethyl nitrate produces ethyl benzene sulphonate and magnesium nitrate. Organic derivatives containing a halogen or sulphur so combined as to be incapable of replacement by organic acid radicals are not liquid esters of inorganic acids.

To the end that the description of the operation may be complete, it is pointed out that the best method known to us at this time whereby hydrocarbons, particularly hydrocarbons having four to six or more carbon atoms, may be chlorinated to produce a large proportion of primary monochlorides, is described in the copending applications of Eugene E. Ayres, Jr., Ser. No. 45,436, filed July 22nd, 1925, and Ser. No. 165,876, filed February 4, 1927, the chlorinating process therein described comprising mixing with a lesser volume of chlorine vapor the vapor of the hydrocarbon that is to be chlorinated, such mixture being brought about by introducing one of the vapors into the other of the vapors while the latter vapor is passing at relatively high velocity through a conduit, then passing the mixture to a heating operation and thereby heating the mixture, preferably in the absence of actinic rays or electric discharges, to a temperature sufficiently elevated to effect the desired reaction by heat, and separating, preferably by rectification, the chlorinated hydrocarbon from the products passing from the heating operation. Other details and features of said chlorinating operation are described and claimed in said applications last mentioned.

While we have referred to various details for the purpose of completely disclosing our invention we do not intend to be limited thereto but intend that our invention shall include such modifications and variations as fall within the hereunto appended claims. And in this connection it is pointed out that there is no definite limit upon the quantity of water present during the hydrolysis of the liquid ester of an inorganic acid except that some water should be present and enough water should be present to dissolve the salt produced. And in the same connection it is pointed out that a reference herein to a salt of a substantially water-insoluble fatty acid is intended to include such salts that are both water-soluble and insoluble and to include not only the salts of such acids themselves but the salts of such derivatives of those acids as have the same colloidal characteristics as the salts of such acids themselves, for example the salts of the sulphonic derivatives of such acids.

From the foregoing it will be apparent that our process may be carried out in successive steps or certain steps may be carried out simultaneously in which latter case an organic ester, such as an ester consisting of the basic radical of an inorganic acid ester combined with the acid radical of a substantially water-insoluble fatty acid, acts in a sense as a catalyst. The manner in which our process is carried out depends upon the particular time when the several substances are introduced into the reacting chamber. This is well illustrated in the hydrolysis of an inorganic ester in accordance with our invention. Thus, an inorganic ester that is to be hydrolyzed may be reacted with a salt of a substantially water-insoluble fatty acid to produce an organic ester, and then that organic ester may be merely reacted with a suitable alkali producing soap and an alcohol that may be recovered, or the organic ester may be reacted alternately with a suitable alkali and with additional quantities of the inorganic ester, or the organic ester may be heated together with both a suitable alkali and further quantities of inorganic ester. In the latter case additional quantities of inorganic ester and suitable alkali may be added together to the reaction one or more times after the first reaction has been carried to a sufficiently complete degree. Thus our process may be carried on in steps in which case the actual steps and their sequence depend upon the point in the cycle at which the process begins or upon the nature of the substances started with, or the hydrolysis may be carried out in a single reaction in which the organic ester acts in a sense as a catalyst.

What we claim and desire to secure by Letters Patent is:

1. The process of substituting hydroxyl group in place of the acid radicals in liquid esters of inorganic acids which comprises heating such an ester with an aqueous alkaline agent in the presence of an ester which contains a basic radical like the basic radical of said inorganic acid ester combined with the acid radical of a substantially water-insoluble fatty acid.

2. The process of substituting hydroxyl groups for halogens in liquid halogen derivatives of hydrocarbons which comprises heating such a halogen derivative with an aqueous alkaline agent in the presence of an ester which contains a basic radical like the hydrocarbon radical of said halogen derivative combined with the acid radical of a substantially water-insoluble fatty acid.

3. The process of substituting hydroxyl groups in place of the acid radicals in a liquid ester of an inorganic acid which comprises treating said ester with a salt of a substantially water-insoluble fatty acid in the presence of water, and in the presence of the resulting product heating a quantity of said inorganic ester with an aqueous alkaline agent.

4. The process of substituting hydroxyl groups in place of the acid radicals in liquid esters of inorganic acids which comprises treating said esters with soap containing water, and heating the resulting product with an aqueous alkaline agent.

5. The process of substituting hydroxyl groups in place of the acid radicals in liquid esters of inorganic acids which comprises heating said esters with soap containing water and treating the resulting product with an aqueous alkaline agent.

6. In the process of substituting hydroxyl groups in place of the acid radicals in liquid esters of inorganic acids the steps comprising heating an aqueous alkaline agent with an ester which contains a basic radical like the basic radical of such an inorganic acid ester combined with the acid radical of a substantially water-insoluble fatty acid, and heating together the resulting product and said inorganic acid ester.

7. The process of substituting hydroxyl groups for halogens in liquid halogen derivatives of hydrocarbons which comprises treating the derivative with soap containing water, and heating the resulting product with an aqueous alkaline agent.

8. The process of substituting hydroxyl groups for halogens in liquid halogen derivatives of hydrocarbons which comprises treating the derivative with soap containing water, and in the presence of the resulting product heating additional quantities of said derivative with an aqueous alkaline agent.

9. The process of substituting hydroxyl groups in place of the acid radicals in liquid esters of inorganic acids which comprises heating together the liquid esters and a salt of a substantially water-insoluble fatty acid in the presence of water, heating the mixture until the action is complete, and heating the resultant product and an aqueous alkaline agent in the presence of additional quantities of inorganic acid esters so treated.

10. The process of substituting hydroxyl groups in place of the acid radicals in liquid esters of inorganic acids which comprises heating said esters and an aqueous alkaline agent in the presence of a catalyst comprising an ester of a substantially water insoluble fatty acid.

11. The process of substituting hydroxyl groups in place of the acid radicals of liquid esters of inorganic acids which comprises heating such a liquid ester with a substantially water-insoluble fatty acid and an aqueous alkaline agent in a closed vessel at 125° C. to 225° C., and then adding to the resultant product additional quantities of the inorganic acid ester and of the aqueous alkaline agent and heating the closed vessel at substantially the same temperature.

12. The process of substituting hydroxyl groups in place of the acid radicals in liquid esters of inorganic acids which comprises heating an aqueous alkaline agent with an ester which consists of a basic radical like the basic radical of said inorganic acid ester combined with the acid radical of a soap forming organic acid, and heating together the resulting product and said inorganic acid esters and additional quantities of aqueous alkaline agent.

13. The process of substituting hydroxyl groups in place of the halogens in liquid halogen derivatives of hydrocarbons which comprises heating an aqueous alkaline agent with an ester which consists of a basic radical like the hydrocarbon radical of said derivative combined with the acid radical of a soap forming organic acid, and heating together the resulting product and said halogen derivatives and additional quantities of aqueous alkaline agent.

14. The process of substituting hydroxyl groups for chlorine in liquid chlorine derivatives of hydrocarbons which comprises heating together such a derivative, an aqueous alkaline agent, and an ester which comprises a basic radical like the hydrocarbon radical of said chlorine derivative combined with the acid radical of a soap forming organic acid.

15. The process of hydrolyzing pentane halide which comprises heating the halide with soap containing water and then heating the resulting product with an aqueous alkaline agent and an additional quantity of the halide.

16. The process of hydrolyzing amyl chloride which comprises heating a substantially water-insoluble fatty acid, amyl chloride and aqueous caustic soda in a closed vessel at 150° C. and thereby producing an organic ester, then heating in a closed vessel at substantially the same temperature the ester and additional quantities of amyl chloride and aqueous caustic soda and separating amyl alcohol from the resulting product.

17. The process of producing amyl alcohol which comprises heating amyl chloride with soap containing water in a closed vessel and then adding aqueous caustic soda and heating the mixture.

18. The process of producing amyl alcohol which comprises heating amyl chloride with an aqueous alkaline agent and an amyl ester of a substantially water-insoluble fatty acid in a closed vessel.

19. The process of substituting hydroxyl groups in place of the acid radicals in liquid esters of inorganic acids which comprises reacting said esters and an alkaline hydrolyzing agent in the presence of an ester of a substantially water-insoluble fatty acid.

20. In the process of substituting hydroxyl groups in place of acid radicals in a liquid ester of an inorganic acid, the step which consists in adding to the reaction mixture a catalyst comprising an ester of a substantially water insoluble fatty acid.

21. In the process of substituting hydroxyl groups in place of acid radicals in amyl chloride, the step which consists in adding to the reaction mixture a catalyst comprising an ester of a substantially water insoluble fatty acid.

22. The process which comprises heating amyl chloride with an aqueous alkaline agent and amyl oleate in a closed vessel.

23. In the process of substituting hydroxyl groups in place of acid radicals in amyl chloride, the step which consists in adding to the reaction mixture amyl oleate as a catalyst.

24. In a process for producing alcohol having four to six carbon atoms, the steps comprising heating the corresponding halide derivative of a hydrocarbon with the corresponding ester of a substantially water-insoluble fatty acid and an alkaline agent in the presence of water.

25. In a process for producing amyl alcohol, the steps comprising heating in a closed vessel in the presence of salt water an alkaline agent and an amyl ester of which the basic radical is the same as the desired alcohol radical and of which the acid radical is the same as the acid radical of a substantially water-insoluble fatty acid, and separating salt water from the resulting product and from any residual amyl ester by gravity.

In testimony whereof, we have signed our names to this specification.

EUGENE E. AYRES, Jr.
ERLING H. HAABESTAD.